(12) United States Patent
Nagasawa et al.

(10) Patent No.: US 9,415,794 B2
(45) Date of Patent: Aug. 16, 2016

(54) TELESCOPIC STEERING DEVICE

(71) Applicant: NSK LTD., Tokyo (JP)

(72) Inventors: Makoto Nagasawa, Maebashi (JP);
Suguru Sugishita, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/781,109

(22) PCT Filed: Apr. 21, 2014

(86) PCT No.: PCT/JP2014/061188
§ 371 (c)(1),
(2) Date: Sep. 29, 2015

(87) PCT Pub. No.: WO2014/175224
PCT Pub. Date: Oct. 30, 2014

(65) Prior Publication Data
US 2016/0046317 A1 Feb. 18, 2016

(30) Foreign Application Priority Data

Apr. 26, 2013 (JP) ................................ 2013-094421
May 23, 2013 (JP) ................................ 2013-108724
Apr. 7, 2014 (JP) ................................ 2014-078439

(51) Int. Cl.
*B62D 1/185* (2006.01)
*B62D 1/184* (2006.01)
(52) U.S. Cl.
CPC ................ *B62D 1/185* (2013.01); *B62D 1/184* (2013.01)
(58) Field of Classification Search
CPC ................................ B62D 1/184; B62D 1/185

USPC ........................................................... 74/493
See application file for complete search history.

(56) References Cited

U.S. PATENT DOCUMENTS

| 8,505,407 | B2 * | 8/2013 | Nomura | B62D 1/184 |
| | | | | 280/775 |
| 2006/0028010 | A1 * | 2/2006 | Yamada | B62D 1/184 |
| | | | | 280/775 |
| 2010/0000366 | A1 * | 1/2010 | Nomura | B62D 1/184 |
| | | | | 74/493 |
| 2012/0247258 | A1 * | 10/2012 | Maniwa | B62D 1/184 |
| | | | | 74/493 |
| 2015/0107398 | A1 * | 4/2015 | Nagasawa | B22D 17/00 |
| | | | | 74/493 |
| 2015/0122075 | A1 * | 5/2015 | Mihara | B62D 1/185 |
| | | | | 74/493 |

FOREIGN PATENT DOCUMENTS

| JP | 51-026618 U | 2/1976 |
| JP | 11-078654 A | 3/1999 |
| JP | 2003-002211 A | 1/2003 |

(Continued)

OTHER PUBLICATIONS

Search Report dated Jul. 22, 2014, issued by the International Searching Authority in counterpart International Application No. PCT/JP2014/061188 (PCT/ISA/210).

(Continued)

*Primary Examiner* — Faye M Fleming
(74) *Attorney, Agent, or Firm* — Sughrue Mion, PLLC

(57) ABSTRACT

In an upper end portion of a front end portion of an outer column, a cutout which is opened to a front end edge of the outer column is provided in a state of being overlapped on a front end portion of an outer shaft in a radial direction. Accordingly, during insertion work, a state of core dislocation can be visually confirmed through the cutout.

7 Claims, 14 Drawing Sheets

(56) References Cited

FOREIGN PATENT DOCUMENTS

| | | |
|---|---|---|
| JP | 2005-280622 A | 10/2005 |
| JP | 2005-313756 A | 11/2005 |
| JP | 2006-069524 A | 3/2006 |
| JP | 2007-292165 A | 11/2007 |
| JP | 2009-190670 A | 8/2009 |
| JP | 2010-254204 A | 11/2010 |
| JP | 2013-035474 A | 2/2013 |
| JP | 2013-047025 A | 3/2013 |

OTHER PUBLICATIONS

Written Opinion dated Jul. 22, 2014, issued by the International Searching Authority in counterpart International Application No. PCT/JP2014/061188 (PCT/ISA/237).

Written Opinion dated May 19, 2015, issued by the International Preliminary Examining Authority in counterpart International Application No. PCT/JP2014/061188 (PCT/IPEA/408).

* cited by examiner

TELESCOPIC STEERING DEVICE

TECHNICAL FIELD

The present invention relates to a telescopic steering device which can adjust a front-rear position of a steering wheel in accordance with a physical stature or a driving posture of a driver.

BACKGROUND ART

A vehicle steering device is configured as illustrated in FIG. 9. That is, the steering device transfers rotation of a steering wheel 1 to an input shaft 3 of a steering gear unit 2, pushes or pulls a pair of left and right tie rods 4, 4 in accordance with the rotation of the input shaft 3, and provides a steering angle to front wheels. The steering wheel 1 is supported and fixed to a rear end portion of a steering shaft 5. The steering shaft 5 is supported to be freely rotatable by a steering column 6 in a state of being inserted into the cylindrical steering column 6 in an axial direction. A front end portion of the steering shaft 5 is connected to a rear end portion of an intermediate shaft 8 via a universal joint 7, and connects a front end portion of the intermediate shaft 8 to the input shaft 3 via another universal joint 9. Within the entire range of the specification and patent claims, a front-rear direction, a left-right direction (width direction), and a vertical direction refers to a front-rear direction, a left-right direction (width direction), and a vertical direction of a vehicle (vehicle body) unless otherwise stated.

The illustrated steering device includes therein an electric assist device which lowers the operating force of the steering wheel 1. Therefore, a housing 10 is provided and fixed to a front end portion of the steering column 6, and an electric motor 11 is supported and fixed to the housing 10. The electric motor 11 provides an output torque to the steering shaft 5 via a gear unit or the like (not shown) which is provided inside the housing 10.

In this steering device, there has been known a tilt mechanism for adjusting the vertical position of the steering wheel 1 or a telescopic mechanism for adjusting the front-rear position of the steering device in accordance with a physical stature or a driving posture of a driver. FIGS. 10 to 14 illustrate an example which is described and known in Patent Document 1 or the like as the tilt and telescopic steering device including both the tilt mechanism and the telescopic mechanism. The tilt and telescopic steering device includes a steering column 6a, a steering shaft 5a, a supporting bracket 12, an adjusting rod 13, a pair of pressing portions 14a, 14b, and an adjusting lever 15.

The steering column 6a is configured by externally fitting a front portion of a cylindrical outer column 17 which is a rear column, to a rear portion of a cylindrical inner column 16 which is a front column, to be displaceable in the axial direction, and the whole length of the steering column 6a can be elongated and contracted. A housing 10a which is provided and fixed to the front end portion of the inner column 16 is supported to be swingably displaceable around a supporting shaft 19 with respect to a vehicle body 18. The outer column 17 is made by die cast molding a light alloy, such as an aluminum-based alloy or a magnesium-based alloy, and an inner diameter of the front portion can be elastically expanded and contracted. Therefore, an axial slit 20 which is long in the axial direction is provided in a lower end portion in a direction perpendicular to the axial direction of the front portion of the outer column 17. In the lower portion of the outer column 17, a pair of sandwiched portions 21, 21 are provided at a position which interposes a middle portion in the front-rear direction of the axial slit 20 from both sides in the width direction. In a lower half portion of the front end portion of the outer column 17, a circumferential slit 22 which is long in a circumferential direction is provided. A front end portion of the axial slit 20 is opened to a middle portion of the circumferential slit 22 in a length direction. Incidentally, a structure in which the front end portion of the axial slit 20 is opened to a front end surface of the outer column without providing the circumferential slit 22 is also conventionally known. In any case, the outer column 17 includes a portion between both end edges of the axial slit 20 with respect to the axial direction as an expansion and contraction cylinder portion 23 which can elastically expand and contract a diameter dimension thereof. While the diameter dimension of the expansion and contraction cylinder portion 23 is elastically expanded and contracted, surface pressure of an abutting portion between an inner circumferential surface of the expansion and contraction cylinder portion 23 and an outer circumferential surface of the rear portion of the inner column 16 is changed. Based on this change in the surface pressure, a state where a relative displacement between the inner column 16 and the outer column 17 in the axial direction is enabled and a state where the relative displacement is not enabled can be switched. Further, at a portion where the sandwiched portions 21, 21 match each other, front-rear long holes 24, 24 which are long in the axial direction of the outer column 17 are respectively provided.

The steering shaft 5a includes a spline shaft portion 27 which is provided in a rear portion of an inner shaft 25 which is a front shaft, and is formed with a male spline portion on the outer circumferential surface, and a spline hole 28 which is provided in a front portion of an outer shaft 26 which is a rear shaft, and in which a tip end is opened and a female spline portion is formed on an inner circumferential surface. Since the spline shaft portion 27 and the spline hole 28 are spline-engaged to be capable of transferring torque and to be slidable in the axial direction, the whole length of the steering shaft 5a can be elongated and contracted. A coating layer which is provided on a surface of the male spline portion and is made of a synthetic resin having a low coefficient of friction, such as a polyamide resin, prevents generation of tooth hammering noise or sliding noise between metals in an engagement portion between the spline shaft portion 27 and the spline hole 28, and sliding resistance of the engagement portion in the axial direction is suppressed to be lower. In the steering shafts 5a, in a state of being inserted into the steering column 6a in the axial direction, the inner shaft 25 is disposed on an inner diameter side of the inner column 16, and the outer shaft 26 is disposed on an inner diameter side of the outer column 17. In this state, the steering shaft 5a links the front end portion of the inner shaft 25 to a shaft member 31 (refer to FIG. 3) provided inside the housing 10a to be capable of transferring torque, and supports the shaft member 31 to be only rotatable by a pair of single-row deep groove ball bearings 32a, 32b (refer to FIG. 3) which are front rolling bearings with respect to the housing 10a. The steering shaft 5a supports a rear end side portion of the outer shaft 26 to be only rotatable by a single-row deep groove ball bearing 33 (refer to FIG. 3) which is a rear rolling bearing, with respect to the rear end portion of the outer column 17. Therefore, the steering shaft 5a is elongated and contracted in accordance with the elongation and contraction of the steering column 6a. A portion which protrudes to the rear side further than a rear end opening of the outer column 17 in the rear end portion of the outer shaft 26 supports and fixes the steering wheel 1.

A supporting bracket 12 is configured by bending a metal plate which can ensure necessary strength and rigidity, such as a steel plate, is supported by the vehicle body 18, and includes a pair of left and right supporting plate portions 29, 29 (refer to FIG. 11) which are parallel to each other. At a portion where the supporting plate portions 29, 29 match each other, partially arc-shaped vertical long holes 30, 30 are formed around the supporting shaft 19. The adjusting rod 13 is inserted through the vertical long holes 30, 30 and the front-rear long holes 24, 24. In both end portions of the adjusting rod 13, at a portion which protrudes from the outer side surface of the supporting plate portions 29, 29, pressing portions 14a, 14b are provided. The adjusting lever 15 can expand and contract an interval between the pressing portions 14a, 14b. As an expansion and contraction device for expanding and contracting the interval between the pressing portions 14a, 14b by the adjusting lever 15, in the illustrated structure, a screw device which includes a bolt and a nut is employed. Instead of this, a structure which employs another expansion and contraction device, such as a cam device including a driving side cam and a driven side cam, is also conventionally known. Even when any of the expansion and contraction devices are employed, the adjusting lever 15 is provided in one end portion of the adjusting rod 13, and expands and contracts the interval between the pressing portions 14a, 14b by rotating around the adjusting rod 13.

When performing position adjustment of the steering wheel 1, the adjusting lever 15 is swingably displaced in a predetermined direction (generally downward), and the interval between the pressing portions 14a, 14b is expanded. Then, the surface pressure of the abutting portion between the inner side surface of the supporting plate portions 29, 29 and the outer side surface of the sandwiched portions 21, 21 is decreased or lost. At the same time, an inner diameter of the expansion and contraction cylinder portion 23 of the outer column 17 elastically expands, and the surface pressure of the abutting portion between the inner circumferential surface of the expansion and contraction cylinder portion 23 and the outer circumferential surface in the rear portion of the inner column 16 is decreased or lost. As a result, within a range in which the adjusting rod 13 can be displaced on the inner sides of the front-rear long holes 24, 24 and the vertical long holes 30, 30, the front-rear position and the vertical position of the steering wheel 1 can be adjusted. In this state, the steering wheel 1 is adjusted to a desired position. After the adjustment, the adjusting lever 15 is swingably displaced in a direction reverse to the predetermined direction, and contracts the interval between the pressing portions 14a, 14b. Accordingly, the surface pressure of each abutting portion is raised, and the steering wheel 1 is maintained at a position after the adjustment.

When assembling the above-described tilt and telescopic steering device, operability can be improved if press-fitting of the single-row deep groove ball bearings 32a, 32b, 33 to the shaft member 31 (refer to FIG. 3) linked to the outer column 17, the outer shaft 26 and the inner shaft 25 is performed before assembling the steering shaft 5a (refer to FIG. 10) and the steering column 6a which is elongated and contracted in the axial direction.

If this method is employed, a front assembly 34 which includes the inner shaft 25, the shaft member 31, the inner column 16, the housing 10a, and the single-row deep groove ball bearings 32a, 32b, and a rear assembly 35 which includes the outer shaft 26, the outer column 17, and the single-row deep groove ball bearing 33, are separately assembled. Thereafter, the steering device is assembled in a work procedure of configuring the steering column 6a by inserting the rear portion of the inner column 16 into the front portion of the outer column 17, and configuring the steering shaft 5a by inserting the spline shaft portion 27 into the spline hole 28.

However, when inserting the spline shaft portion 27 into the spline hole 28 in this work procedure, in a state before the insertion, there is a possibility that the spline shaft portion 27 which configures the front assembly 34 and the spline hole 28 which configures the rear assembly 35 cause fine core dislocation due to the influence of gravity, internal clearance, or roundness of a raceway in the single-row deep groove ball bearings 32a, 32b, 33. For this reason, when inserting the spline shaft portion 27 into the spline hole 28 without confirming the state of the core dislocation, there is a case where the insertion is not smoothly performed. Further, in accordance with the insertion, there is a possibility that the coating layer provided on the surface of the spline shaft portion 27 is indented or damaged. For example, when an axial tip end edge of male spline teeth which configure the spline shaft portion 27 is strongly pressed to an opening circumferential edge portion of the spline hole 28, in accordance with the pressing, a part of the coating layer is pressed and crushed, and there is a possibility that the pressed and crushed part is projected to the inside of a male spline groove which configures the spline shaft portion 27. When the pressed and crushed part is projected to the inside of the male spline groove, in a state where the insertion of the spline shaft portion 27 into the spline hole 28 is completed, the projected part is in a state of being strongly pressure-welded to the inner circumferential surface of the spline hole 28. As a result, there is a possibility that a problem that the sliding resistance between the spline hole 28 and the spline shaft portion 27 in the axial direction increases is caused.

Incidentally, in the above-described tilt and telescopic steering device, in a state where the rear assembly 35 is assembled, a tip end edge of the spline hole 28 is disposed on the inner diameter side of the outer column 17. For this reason, the insertion of the spline shaft portion 27 into the spline hole 28 is performed on the inner diameter side of the outer column 17. Therefore, when inserting the spline shaft portion 27 into the spline hole 28, a state of each core dislocation cannot be viewable, and as a result, there is a possibility that the above-described problem is caused.

BACKGROUND ART

Patent Document

Patent Document 1: JP-A-2013-47025

SUMMARY OF THE INVENTION

Problem to be Solved

In view of the above circumstances, an object of the present invention is to provide a telescopic steering device having a structure in which work of inserting a spline shaft portion into a spline hole can be performed while visually confirming a state of core dislocation after separately assembling a front assembly and a rear assembly.

Means for Solving the Problem

A telescopic steering device of the present invention has a configuration in which a state of a core dislocation can be visually confirmed (viewable) from the outside through a penetrating portion provided in one end portion of an outer column when inserting a spline shaft portion into a spline hole after separately assembling a front assembly and a rear assembly.

Specifically, the telescopic steering device of the present invention includes a front assembly which is disposed on a front side and a rear assembly which is disposed on a rear side.

The front assembly is configured by disposing a front shaft on an inner diameter side of a cylindrical front column while a front end portion of the front column or a housing fixed to the front end portion of the front column supports a front end portion of the front shaft or a shaft member linked to the front end portion by a front rolling bearing to be only rotatable.

The rear assembly is configured by disposing a rear shaft on an inner diameter side of a cylindrical rear column while a rear end portion of the rear column supports a rear side portion of the rear shaft by a rear rolling bearing to be only rotatable.

Among the front column and the rear column, one column is an outer column and the other column is an inner column.

One end side portion on an inner column side of the outer column in an axial direction is provided with an axial slit which is long in the axial direction of the outer column, and a portion between both end edges of the axial slit of the outer column is configured as an expansion and contraction cylinder portion which can elastically expand and contract a diameter dimension.

One end side portion on an outer column side of the inner column in the axial direction is internally fitted to the expansion and contraction cylinder portion of the outer column, and in a state where the one end side portion is internally fitted, a state where a relative displacement between the inner column and the outer column in the axial direction is enabled and a state where the relative displacement is not enabled can be switched based on an elastic expansion and contraction of the diameter dimension of the expansion and contraction cylinder portion.

A spline shaft portion formed with a male spline portion on an outer circumferential surface is provided on one of a rear portion of the front shaft and a front portion of the rear shaft, a spline hole having a tip end which is opened and formed with a female spline portion on an inner circumferential surface is provided on the other of the rear portion of the front shaft and the front portion of the rear shaft, and the spline shaft portion and the spline hole are spline-engaged to be capable of transferring torque and to be slidable in the axial direction.

In particular, in the telescopic steering device of the present invention, if, among the front shaft and the rear shaft, a shaft which is disposed on an inner diameter side of the outer column is referred to as an outer column shaft, and a shaft which is disposed on an inner diameter side of the inner column is referred to as an inner column shaft, an axial position of one end edge on an inner column side of the outer column shaft in the axial direction and an axial position of one end edge (one end edge of the axial slit) on an inner column side of the expansion and contraction cylinder portion of the outer column substantially match each other.

Also, an axial position of one end edge on an outer column side of the inner column shaft in the axial direction and an axial position of one end edge on an outer column side of the inner column in the axial direction substantially match each other.

Further, one end portion on the inner column side of the outer column is formed with a penetrating portion on an opposite portion of the axial slit in a radial direction to penetrate through the opposite portion in the radial direction, and the penetrating portion is provided in a state of being overlapped with one end portion on the inner column side of the outer column shaft in the radial direction.

In the telescopic steering device of the present invention, for example, a displacement range in the axial direction between the axial position of the one end edge on the inner column side of the outer column shaft in the axial direction and the axial position of the one end edge on the inner column side of the expansion and contraction cylinder portion of the outer column is within 3 mm.

Also, a displacement range in the axial direction between the axial position of the one end edge on the outer column side of the inner column shaft in the axial direction and the axial position of the one end edge on the outer column side of the inner column in the axial direction is within 3 mm.

In the telescopic steering device of the present invention, the penetrating portion is a cutout which is opened to the one end edge of the outer column.

Alternatively, the penetrating portion is a window hole which is opened at a rear side than the one end edge of the outer column in the axial direction.

In the telescopic steering device of the present invention, the one end portion of the outer column is formed with a circumferential slit which is long in a circumferential direction on a side where the axial slit is provided in a direction perpendicular to the axial direction, and one end portion of the axial slit is opened to a middle portion of the circumferential slit in a length direction thereof. In this case, at the one end side portion of the outer column, the one end edge (one end edge of the axial slit) of the expansion and contraction cylinder portion is positioned.

In the telescopic steering device of the present invention, an inner diameter portion of the outer column has a large diameter portion which is not in contact with the inner column, and small diameter portions which are provided on front and rear sides of the large diameter portion in the axial direction and are in contact with the inner column, and in the outer column, a rear end edge of the penetrating portion on a side opposite to an insertion side of the inner column is formed to be closer to the insertion side of the inner column than the small diameter portions.

Effects of the Invention

In assembling the telescopic steering device of the present invention, after separately assembling the front assembly and the rear assembly, when inserting the spline shaft portion into the spline hole, it is possible to visually confirm a state of the core dislocation of the spline shaft portion and the spline hole from the outside through the penetrating portion provided in the one end portion of the outer column. For this reason, for example, by grasping and rotating a part which protrudes from the rear end edge of the rear column in the rear end portion of the rear shaft, it is possible to adjust the relative rotation position of the spline shaft portion and the spline hole to a position at which the core dislocations of the spline shaft portion and the spline hole sufficiently decrease. At this time, phases of the male and female splines in the circumferential direction can be adjusted.

The telescopic steering device of the present invention is formed with the penetrating portion at an opposite portion of the axial slit in the radial direction, that is, at a portion which is the most separated from the axial slit, in the one end portion of the outer column. Therefore, an amount of deterioration of the strength of the one end portion of the outer column due to providing of the penetrating portion is suppressed.

In the telescopic steering device of the present invention, the axial position of the one end edge of the expansion and contraction cylinder portion of the outer column and the axial position of the one end edge of the outer column shaft substantially match each other, and the axial position of the one end edge of the inner column in the axial direction and the axial position of the one end edge of the inner column shaft substantially match each other. For this reason, it is possible to ensure that the engagement length (fitting length) between the spline shaft portion and the spline hole is sufficiently long to substantially match the fitting length of the expansion and contraction cylinder portion of the outer column and the inner column, and generation of backlash in an inclination direction in the engagement portion (fitting portion) between the spline shaft portion and the spline hole is suppressed. Furthermore, the necessary length of the inner column and the outer column is reduced, and the necessary length of the spline shaft portion and the spline hole is suppressed.

BRIEF DESCRIPTION OF THE DRAWINGS

FIG. 13 is viewed from a lower side.

DETAILED DESCRIPTION OF EMBODIMENTS

Figure 1:
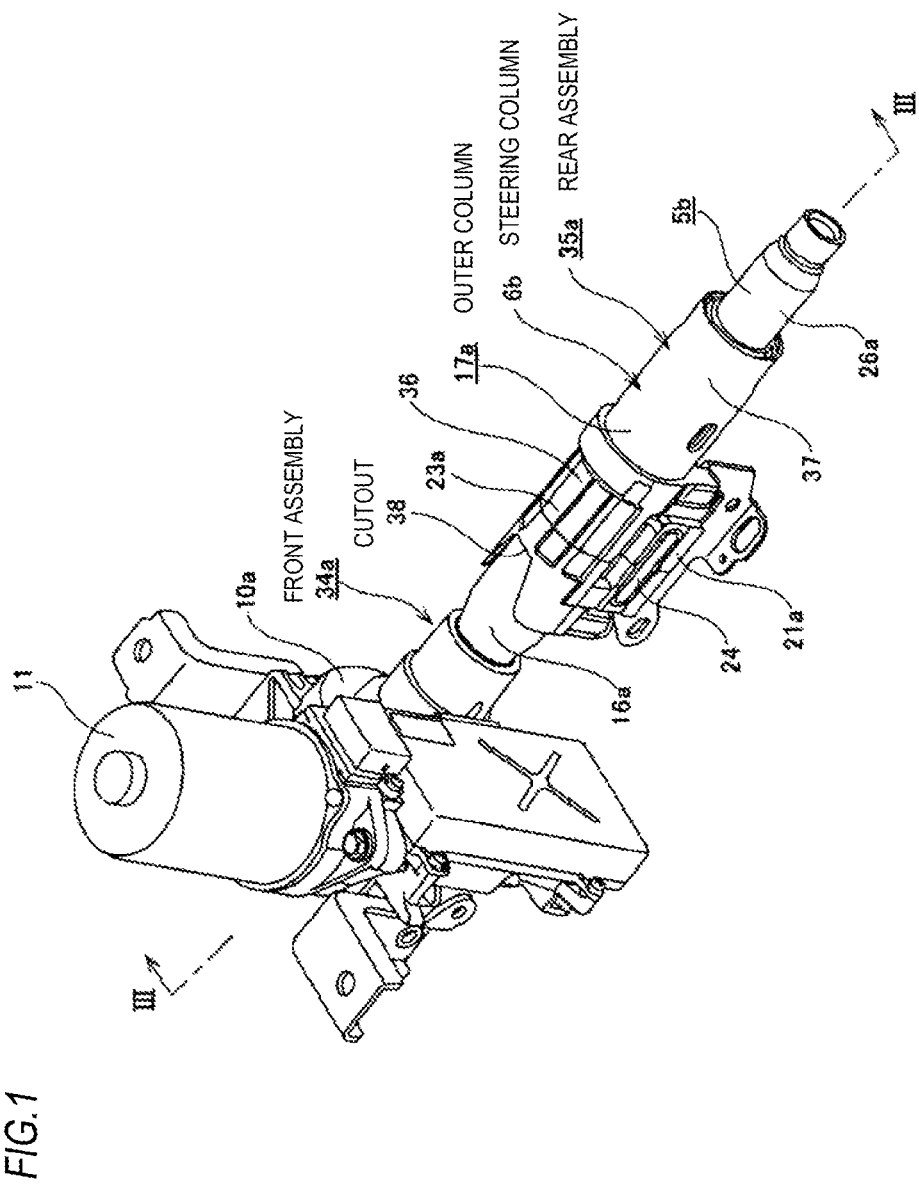
FIG. 1 is a perspective view of an example of an embodiment of the present invention when viewed from a rear upper side.
Figure 2:
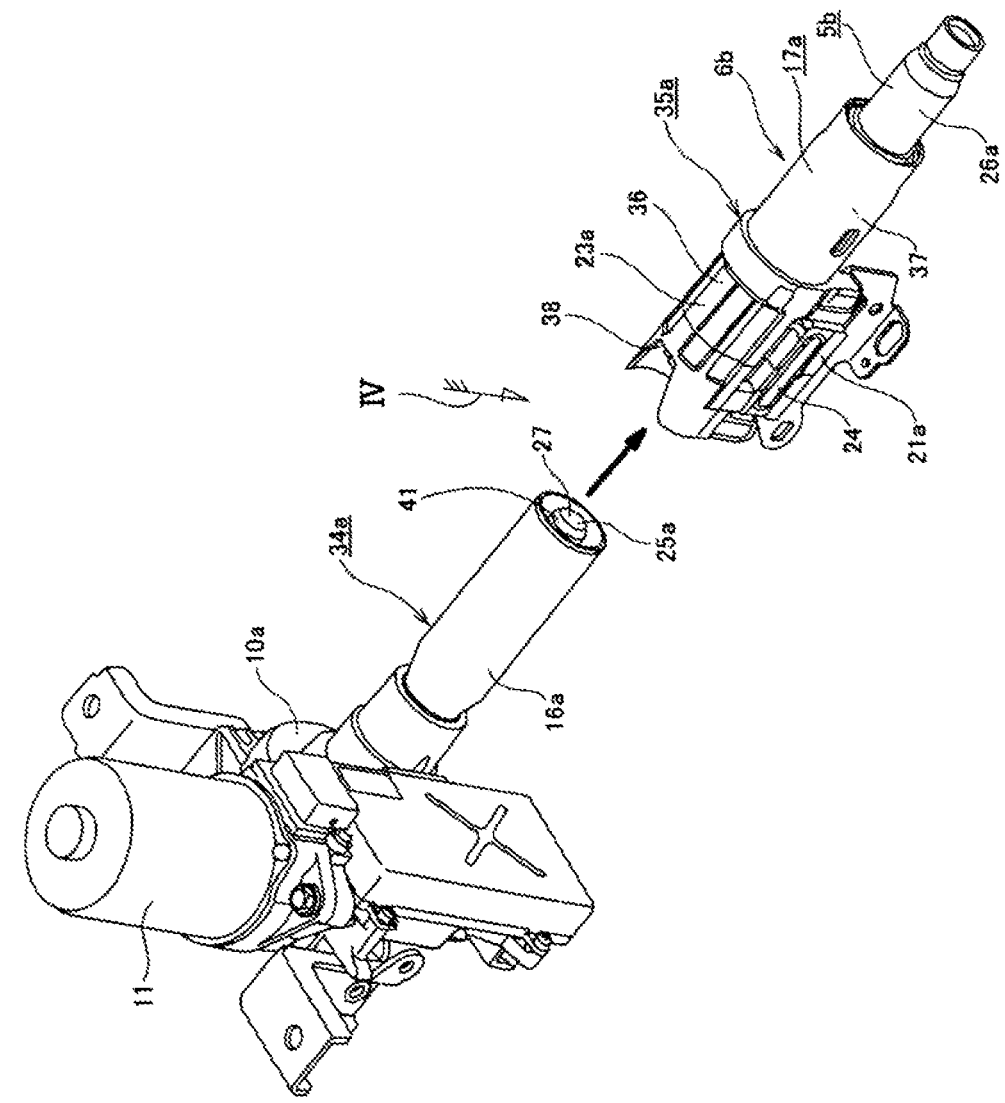
FIG. 2 is a perspective view illustrating a state before assembling a front assembly and a rear assembly when viewed from the same direction as that of FIG. 1.
Figure 3:
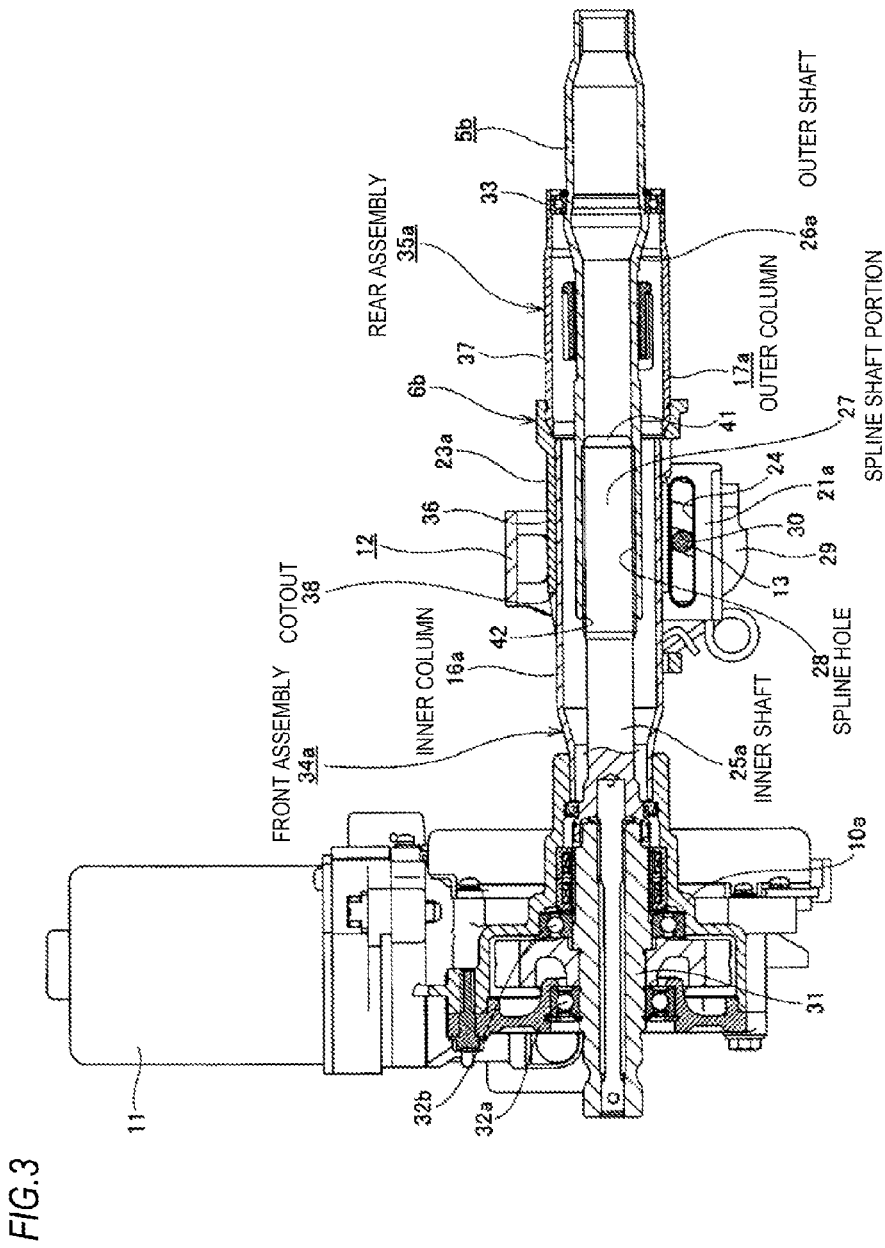
FIG. 3 is a sectional view along line III-III of FIG. 1.

An example of an embodiment of the present invention will be described by using FIGS. 1 to 6, 15A, 15B and 15C. As illustrated in FIGS. 1 to 3, features of this example are mainly that a penetrating portion is provided in a front end portion of an outer column 17a, and that a positional relationship between a rear end edge of an inner column 16a and an end edge of a spline shaft portion 27, and a positional relationship between a front end edge of an expansion and contraction cylinder portion 23a of the outer column 17a and an end edge of a spline hole 28 are adjusted. Since configurations and operations of other parts are substantially similar to those in a case of a conventional structure illustrated in FIGS. 10 to 14, the equivalent parts are given the same reference numerals, and overlapping illustrations in the drawings and description are omitted or simplified. Hereinafter, the description will be focused on the characteristic parts of the example and the parts which are different from those in the conventional structure.

In this example, the outer column 17a is configured by bonding a front half portion 36 which is made of a light alloy, such as an aluminum-based alloy, and a rear half portion 37 which is made of an iron-based alloy, such as carbon steel, in an axial direction. Bonding the front half portion 36 and the rear half portion 37 is performed by a portion which is made by die cast molding of the front half portion 36. In this example, an axial slit 20a (refer to FIGS. 5B and 6B) which is long in the axial direction is provided in a lower end portion of the front half portion 36, and a pair of sandwiched portions 21a, 21a are provided at a position which interposes the axial slit 20a from both sides in the width direction in a lower portion of the front half portion 36. At a front end side portion and a rear end side portion of the lower portion of the front half portion 36, a pair of circumferential slits 22a, 22b which are long in a circumferential direction are respectively provided at portions which correspond to both end portions of both sandwiched portions 21a, 21a in the axial direction, and both front and rear end portions of the axial slit 20a are opened in a middle portion in a length direction of both circumferential slits 22a, 22b. In addition, in the front half portion 36, a portion between both front and rear end edges of the axial slit 20a in the axial direction is used as the expansion and contraction cylinder portion 23a which can elastically expand and contract the diameter dimension. In this example, since the pair of circumferential slits 22a, 22b are provided in both front and rear end portions of the axial slit 20a as described above, the expansion and contraction characteristics (elasticity) of the expansion and contraction cylinder portion 23a is constant across the axial direction. Accordingly, by a clamping operation of an adjusting lever 15 (refer to FIGS. 10 and 11), both sandwiched portions 21a, 21a and the expansion and contraction cylinder portion 23a are pressed constantly across the axial direction with respect to an outer circumferential surface of the inner column 16a. Incidentally, at a portion of the rear half portion 37, a key locking hole 40 (refer to FIGS. 5B and 6B) is provided.

In this example, in an end portion (rear end portion of an inner shaft 25a) of an outer circumferential surface of the spline shaft portion 27 provided in the rear portion of the inner shaft 25a (refer to FIG. 3), a shaft guide portion 41 which is similar to a chamfering portion inclined in a direction in which an outside diameter decreases as proceeding to the end portion on a rear side of the spline shaft portion 27 is provided. In the end portion (front end portion of an outer shaft 26a) on the inner circumferential surface of the spline hole 28 provided in the front portion of the outer shaft 26a, a hole guide portion 42 which is similar to a chamfering portion inclined in a direction in which an inside diameter increases as proceeding to the end portion of the front side is provided. A dimension of the hole guide portion 42 in the axial direction and a dimension of the shaft guide portion 41 in the axial direction respectively have a size which ranges approximately from 0.5 mm to 3 mm.

Figure 4:
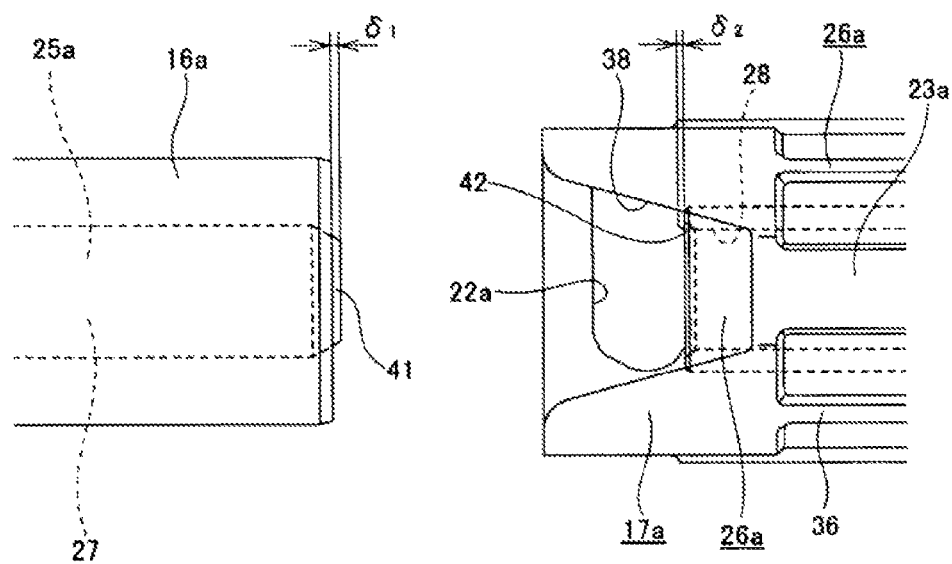
FIG. 4 is a view taken in the direction of an arrow IV of FIG. 2.
Figure 5A:
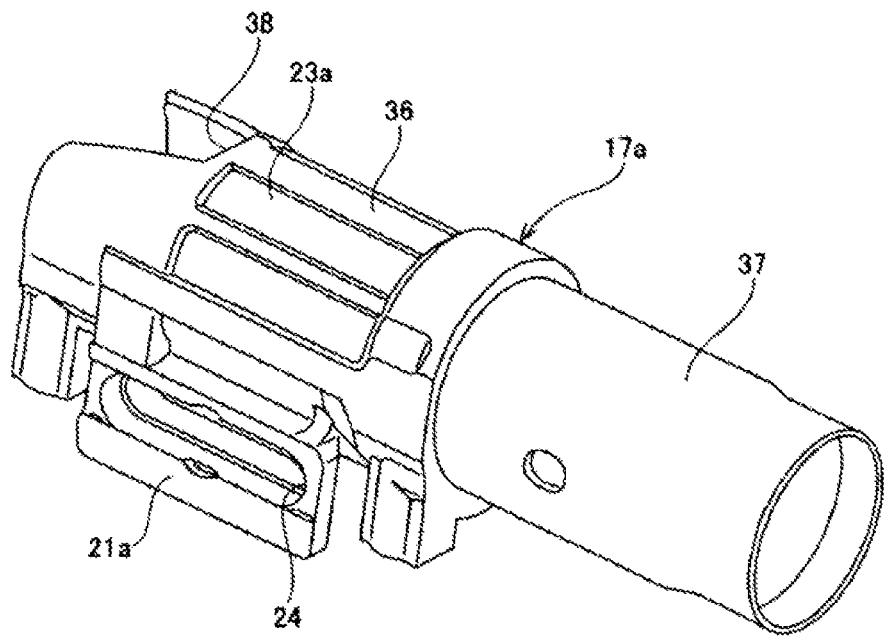
FIG. 5A is a perspective view of an outer column when viewed from a rear upper side.
Figure 5B:
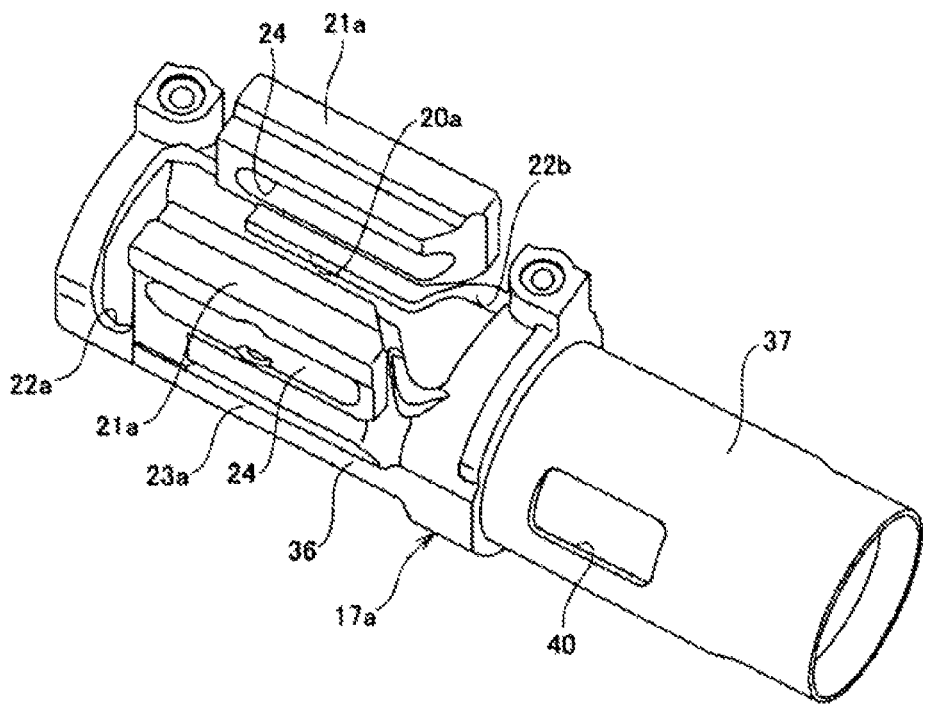
FIG. 5B is a perspective view of the outer column when viewed from a rear lower side.
Figure 6A:
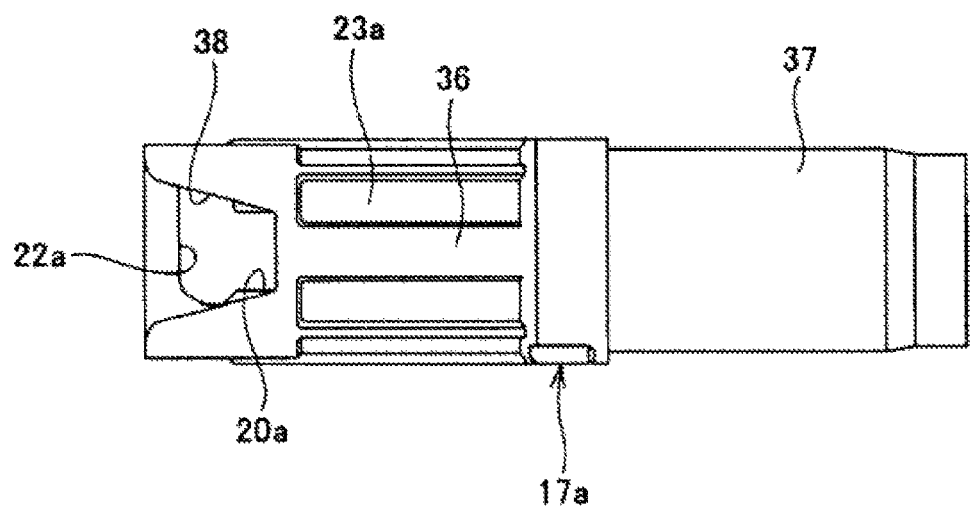
FIG. 6A is a plan view of the outer column when viewed from an upper side.
Figure 6B:
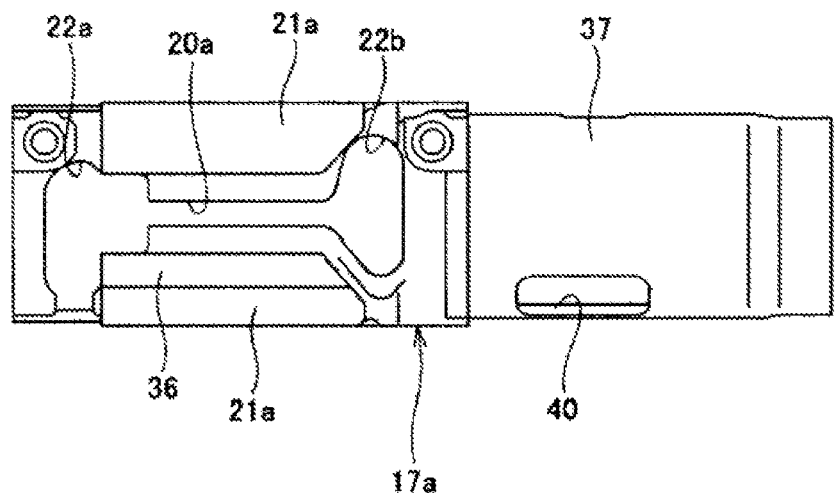
FIG. 6B is a plan view of the outer column when viewed from a lower side.

In this example, in a state where a front assembly 34a is assembled which includes the inner shaft 25a, a shaft member 31, the inner column 16a, a housing 10a, and a pair of single-row deep groove ball bearings 32a, 32b, an axial position of an end edge (rear end edge of the inner shaft 25a) of the spline shaft portion 27 and an axial position of a rear end edge of the inner column 16a substantially match each other. Specifically, as illustrated in FIG. 4, a displacement range $|\delta_1|$ between both axial positions in the axial direction is within 3 mm ($-3$ mm$\leq \delta_1 \leq +3$ mm). When a value of $\delta_1$ is a positive (+) value, the axial position of the end edge of the spline shaft portion 27 becomes a position which protrudes from the rear end edge of the inner column 16a, and when the value of $\delta_1$ is a negative (−) value, the axial position of the end edge of the spline shaft portion 27 becomes a position which retreats to the inside of the inner column 16a.

In this example, in a state where a rear assembly 35a is assembled which includes the outer shaft 26a, the outer column 17a, and a single-row deep groove ball bearing 33, an axial position of an end edge (front end edge of the outer shaft 26a) of the spline hole 28 and an axial position of a front end edge (front end edge of the axial slit 20a) of the expansion and contraction cylinder portion 23a of the outer column 17a substantially match each other. Specifically, a displacement range $|\delta_2|$ between both axial positions in the axial direction is within 3 mm ($-3$ mm$\leq \delta_2 \leq +3$ mm). As illustrated in FIG. 4, when a value of $\delta_2$ is a positive (+) value, the axial position of the end edge of the spline hole 28 becomes a position which is further front side than the front end edge of the expansion and contraction cylinder portion 23a, and when the value of $\delta_2$ is a negative (−) value, the axial position of the end edge of the spline hole 28 becomes a position which is further rear side than the front end edge of the expansion and contraction cylinder portion 23a.

For this reason, it is possible to ensure that an engagement length (fitting length) between the spline shaft portion and the spline hole is sufficiently long to substantially match a fitting length of the expansion and contraction cylinder portion of the outer column and the inner column, and the generation of backlash in an inclination direction in an engagement portion (fitting portion) between the spline shaft portion and the spline hole is suppressed. Furthermore, the necessary length of the inner column and the outer column is reduced, and the necessary length of the spline shaft portion and the spline hole is suppressed. The reasons why each necessary length is suppressed will be described hereinafter with reference to FIGS. 15A, 15B and 15C.

Figure 15A:
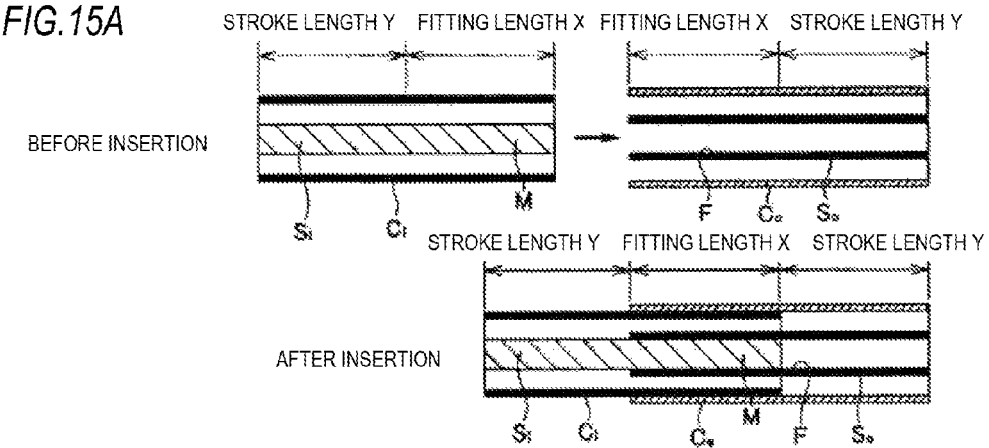
FIG. 15A is a schematic sectional view of a main portion for describing the influence of a positional relationship in an axial direction between each one end edge of the inner column and the outer column and each end edge of a male spline portion and a female spline portion on a length which is necessary for both the inner column and the outer column and a length which is necessary for both the male spline portion and the female spline portion.

FIG. 15A is an example in which an axial position of one end edge of the expansion and contraction cylinder portion of an outer column $C_O$, and an axial position of one end edge of an outer column shaft $S_O$ (spline hole F), match each other, and an axial position of one end edge of an inner column $C_I$, and an axial position of one end edge of an inner column shaft $S_I$ (spline shaft portion M) match each other.

In this example, a necessary length of the outer column $C_O$ (or the spline hole F) is X+Y which is a sum of a fitting length X (=minimum value of a fitting length which changes in accordance with front and rear position adjustment of a steering wheel) with respect to the inner column $C_I$ (or the spline shaft portion M), and a stroke length Y which is a range in which one end edge of the inner column $C_I$ (or spline shaft portion M) is movable in accordance with the front and rear position adjustment of the steering wheel in the outer column $C_O$ (or the spline hole F) during front and rear position adjustment.

A necessary length of the inner column $C_I$ (or the spline shaft portion M) is X+Y which is a sum of a fitting length X with respect to the expansion and contraction cylinder portion (or the spline hole F) of the outer column $C_O$, and a stroke length Y which is a range in which one end edge of the expansion and contraction cylinder portion (or the spline hole F) of the outer column $C_O$ is movable in the axial direction along the outer circumferential surface of the inner column $C_I$ (or spline shaft portion M) during the front and rear position adjustment.

Figure 15B:
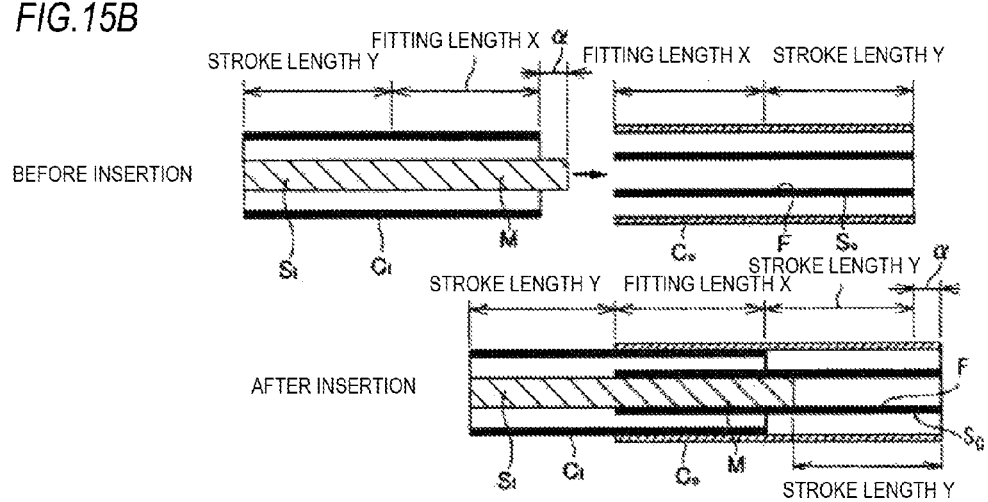
FIG. 15B is a schematic sectional view of a main portion for describing the influence of a positional relationship in an axial direction between each one end edge of the inner column and the outer column and each end edge of the male spline portion and the female spline portion on the length which is necessary for both the inner column and the outer column and the length which is necessary for both the male spline portion and the female spline portion.

Compared to this example illustrated in FIG. 15A, FIG. 15B is an example in which the state of the core dislocation is likely to be visually confirmed (viewable) from the outside, and one end portion of the spline shaft portion M protrudes by $\alpha$ from one end edge of the inner column $C_I$ when inserting the spline shaft portion M into the spline hole F.

A case of this example is the same as the case of the example illustrated in FIG. 15A, and the necessary length of the inner column $C_I$ is X+Y.

However, the necessary lengths of the spline shaft portion M and the outer column $C_O$ (or the spline hole F) are respectively X+Y+$\alpha$ which is longer by $\alpha$ than that of the case of the example illustrated in FIG. 15A.

Figure 15C:
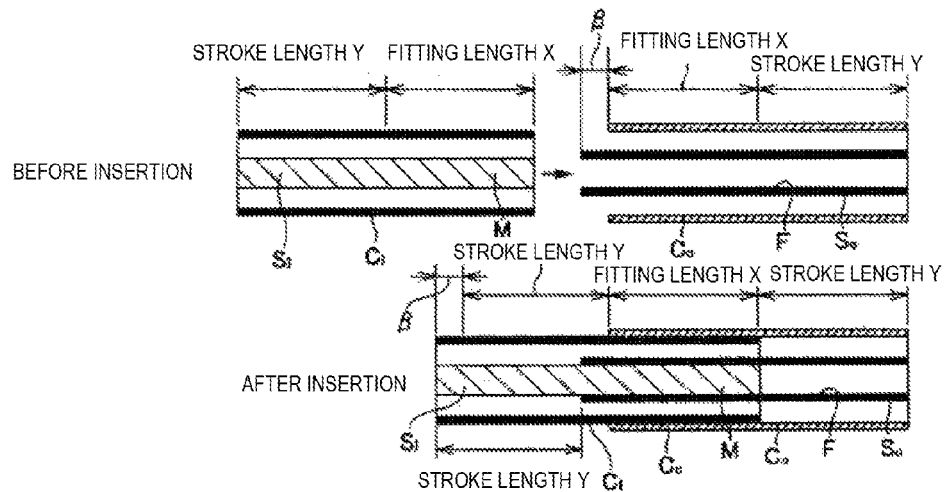
FIG. 15C is a schematic sectional view of a main portion for describing the influence of a positional relationship in an axial direction between each one end edge of the inner column and the outer column and each end edge of the male spline portion and the female spline portion on the length which is necessary for both the inner column and the outer column and the length which is necessary for both the male spline portion and the female spline portion.

Compared to the example illustrated in FIG. 15A, FIG. 15C is an example in which the state of the core dislocation is likely to be visually confirmed (viewable) from the outside, and one end portion of the spline hole F protrudes by $\beta$ from one end edge of the expansion and contraction cylinder portion of the outer column $C_O$ when inserting the spline shaft portion M into the spline hole F.

A case of the example is the same as the case of the example illustrated in FIG. 15A, and the necessary length of the outer column $C_O$ is X+Y.

However, the necessary lengths of the spline hole F and the inner column $C_I$ (or the spline shaft portion M) are respectively X+Y+$\beta$ which is longer by $\beta$ than that of the case of the example illustrated in FIG. 15A.

Therefore, in this example, since a configuration which is substantially similar to that of the case of the example illustrated in FIG. 15A, that is, a configuration in which the axial position of one end edge of the expansion and contraction cylinder portion of the outer column and the axial position of one end edge of the outer column shaft substantially match each other, and the axial position of one end edge of the inner column in the axial direction and the axial position of one end edge of the inner column shaft substantially match each other, is employed, the necessary length of the inner column and the outer column is reduced, and the necessary length of the spline shaft portion and the spline hole is suppressed.

In a case of employing the structure of this example, there is a case where the fitting length X (=minimum value of the fitting length which changes in accordance with the front and rear position adjustment of the steering wheel, refer to FIG. 15A) between the spline shaft portion 27 and the spline hole 28 illustrated in FIG. 4 changes by a permissible amount of backlash generated in the fitting portion between the spline shaft portion 27 and the spline hole 28. For example, when the permissible amount of backlash is strict (low), it is necessary to increase the fitting length X. In this case, in an example illustrated in FIG. 15B, the shaft guide portion 41 (incomplete spline portion: refer to FIG. 4) is not included in the fitting length X in the spline shaft portion 27, and the axial position which is closer to the rear end edge of the portion (complete spline portion) on a base end side than the shaft guide portion 41 and the axial position of the rear end edge of the inner column 16a match each other in the spline shaft portion 27. In this case, the shaft guide portion 41 corresponds to a portion of the dimension α illustrated in an upper half portion of FIG. 15B, and becomes α≤3 mm (0<$\delta_1$≤+3 mm).

For example, when the permissible amount of backlash generated in the fitting portion between the spline shaft portion 27 and the spline hole 28 is not strict so much, in the example illustrated in FIG. 15A, the axial position of the rear end edge of the spline shaft portion 27 including the shaft guide portion 41 and the axial position of the rear end edge of the inner column 16a match each other, and it is possible to decrease the substantive fitting length between the spline shaft portion 27 and the spline hole 28. In this case, $\delta_1$=0.

Meanwhile, the axial position of the rear end edge of the spline shaft portion 27 can also be a position which retreats to the inside of the inner column 16a. In this case, when seen obliquely from the outer diameter side of the inner column 16a, for convenience of assembly work which will be described later, a retreating dimension in the axial direction of the rear end edge of the spline shaft portion 27 which uses the rear end edge of the inner column 16a as a reference, has a permissible range of the extent that a part of the shaft guide portion 41 is seen. In this regard, in the structure of the example, an inner diameter of the rear end edge of the inner column 16a is approximately 40 mm, and an outer diameter of the rear end edge of the shaft guide portion 41 is approximately 20 mm. For this reason, the permissible range of the retreating dimension becomes approximately 3 mm or less (−3 mm≤$\delta_1$<0).

Here, in a case of employing the structure of this example, a displacement range |$\delta_1$| between the axial position of the end edge (rear end edge of the inner shaft 25a) of the spline shaft portion 27 and the axial position of the rear end edge of the inner column 16a is within 3 mm.

Due to the similar reason to that of the above-described case, when employing the structure of this example, the displacement range |$\delta_2$| between the axial position of the end edge (front end edge of the outer shaft 26a) of the spline hole 28 and the axial position of the front end edge (front end edge of the axial slit 20a) of the expansion and contraction cylinder portion 23a of the outer column 17a is within 3 mm.

In this example, in the front end portion of the front half portion 36 of the outer column 17a, at an opposite portion of the axial slit 20a in the radial direction, a cutout 38 which is a penetrating portion that is opened in the front end edge of the front half portion 36 is provided in a state of being overlapped on the end portion (front end portion of the outer shaft 26a) of the spline hole 28 in the radial direction. That is, the rear end edge of the cutout 38 is disposed to be closer to the rear side than the end edge of the spline hole 28. The cutout 38 has a width dimension in the left-right direction (vertical direction in FIG. 4) which becomes larger as proceeding from the rear end edge to the front end edge. Also, the width dimension at a portion which corresponds to the front end edge of the outer shaft 26a in the axial direction is about the same as an outer dimension of the front end edge thereof.

When assembling the telescopic steering device of this example, after separately assembling the front assembly 34a and the rear assembly 35a, by inserting (internally fitting) the rear portion of the inner column 16a into the front portion of the outer column 17a, a steering column 6b is configured. At this time, by inserting the spline shaft portion 27 of the inner shaft 25a into the spline hole 28 of the outer shaft 26a, a steering shaft 5b is configured. In employing this work procedure, when inserting the spline shaft portion 27 into the spline hole 28, the state of the core dislocation of the spline shaft portion 27 and the spline hole 28 can be visually confirmed from the outside through the cutout 38 provided in the front end portion of the outer column 17a. Therefore, for example, by grasping and rotating a part which protrudes from the rear end edge of the outer column 17a in the rear end portion of the outer shaft 26a, it is possible to adjust the relative rotation position of the spline shaft portion 27 and the spline hole 28 to a position at which the core dislocation of the spline shaft portion 27 and the spline hole 28 sufficiently decrease. At the same time, phases of the male and female splines in the circumferential direction can be adjusted. In addition, if the spline shaft portion 27 is inserted into the spline hole 28 while performing the adjustment, based on the guide of both of the shaft guide portion 41 and the hole guide portion 42, insertion can be smoothly performed without pressing and crushing, or damaging a coating layer which is provided on a surface of the spline shaft portion 27 and made of a synthetic resin. Therefore, after completing the insertion of the spline shaft portion 27, it is possible to prevent from causing a problem that a part of the coating layer is strongly pressure-welded to the inner circumferential surface of the spline hole 28, and sliding resistance between the spline hole 28 and the spline shaft portion 27 in the axial direction increases. In this example, the cutout 38 is provided on an opposite portion of the axial slit 20a in the radial direction, that is, on a portion which is the most separated from the axial slit 20a, in the front end portion of the outer column 17a. Accordingly, an amount of deterioration of the strength of the front end portion of the outer column 17a due to providing of the cutout 38 is suppressed.

Figure 16:
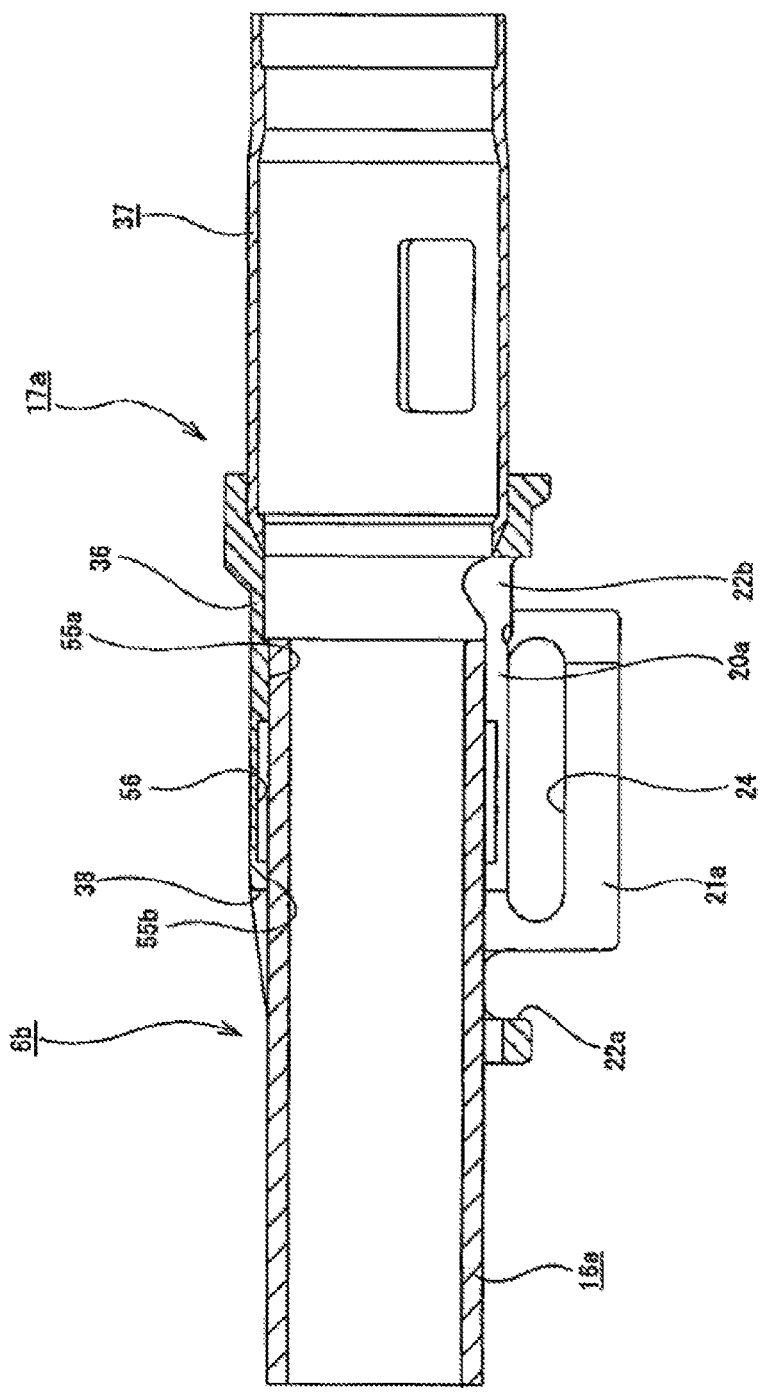
FIG. 16 is a sectional view of the outer column and the inner column along line VI-VI of FIG. 6A.

Further, as illustrated in FIG. 16, the outer column 17a may be configured by forming a large diameter portion 56 which is not in contact with the inner column 16a by enlarging an inner diameter at a portion of the inner diameter portion of the outer column 17a which opposes the outer circumferential surface of the inner column 16a. In this illustrated example, the large diameter portion 56, and small diameter portions 55a, 55b which are in contact with the inner column 16a on the front and the rear sides of the large diameter portion 56 in the axial direction, are formed in the inner diameter portion of the outer column 17a.

Among the small diameter portions 55a, 55b, the small diameter portion 55b which is closer to the insertion side of the inner column 16a of the outer column 17a is not discontinued by the cutout 38 in the circumferential direction. That is, in the outer column 17a, the rear end edge on a side opposite to the insertion side of the inner column 16a of the cutout 38 is formed to be closer to the insertion side of the inner column 16a than the small diameter portion 55b.

According to this configuration, when adjusting the front and rear positions of the steering wheel, without generating an unnecessary discontinuous portion in the small diameter portion 55b, the shape of an axial sectional surface is maintained to have a continuous C shape. As a result, the inner column 16a can be prevented from being hooked to the inside of the outer column 17a, and the steering wheel can be smoothly adjusted.

In this example, the axial position of the rear end edge of the inner shaft 25a and the axial position of the end edge of the spline shaft portion 27 substantially match each other, and the axial position of the end edge of the spline hole 28 and the axial position of the front end edge of the expansion and contraction cylinder portion 23a of the outer column 17a substantially match each other. Therefore, it is possible to ensure that the engagement length (fitting length) between the spline shaft portion 27 and the spline hole 28 is long, and the generation of backlash in the inclination direction in the engagement portion (fitting portion) between the spline shaft portion 27 and the spline hole 28 is suppressed. Further, the necessary length of the inner column 16a and the outer column 17a is suppressed, and the necessary length of the spline shaft portion 27 and the spline hole 28 is suppressed. The reason for that was described with reference to FIGS. 15A, 15B and 15C.

Figure 7A:
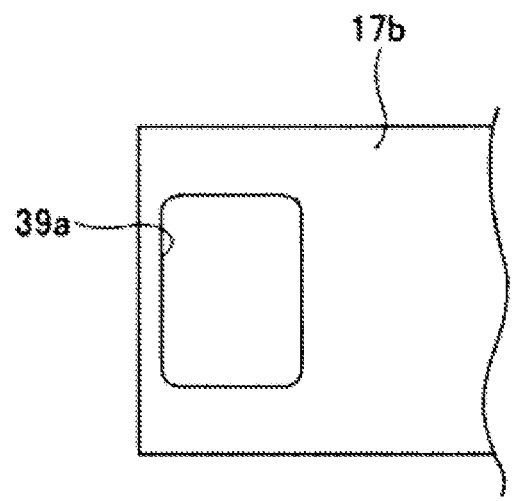
FIG. 7A is a schematic plan view illustrating an example of a penetrating portion provided in a front end portion of the outer column.
Figure 7B:
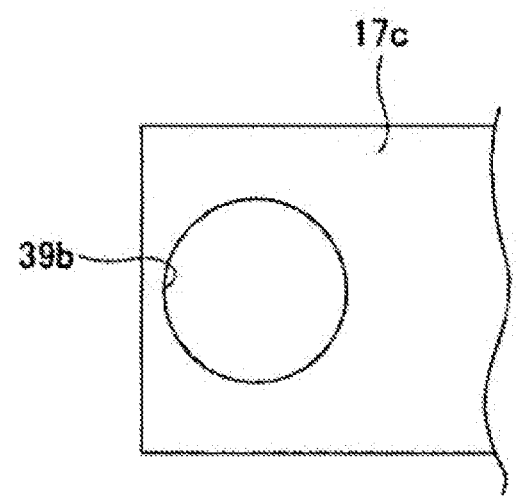
FIG. 7B is a schematic plan view illustrating an example of the penetrating portion provided in the front end portion of the outer column.

In a case of employing this example, instead of the cutout 38, as the penetrating portion provided in the front end portion of the outer column, window holes 39a and 39b which are not opened to the front end edge of the outer columns 17b, 17c, that is, the window holes 39a, 39b which are opened at the rear side than the front end edge of the outer columns 17b and 17c in the axial direction can be employed as illustrated in FIGS. 7A and 7B.

In the example, a structure in which the front column is taken as the outer column, and the rear column is taken as the inner column, or a structure in which the spline hole is provided in the rear portion of the front shaft, and the spline shaft portion is provided in the front portion of the rear shaft can also be employed.

In the example, a structure in which the front end portion of the front shaft is supported to be only rotatable by the front rolling bearing in the front end portion of the front column without providing the housing of an electric assist device on the front side of the front column can also be employed.

In the example, a structure in which the axial slit is provided in the upper end portion of a portion on one end side of the outer column can be employed.

Figure 8:
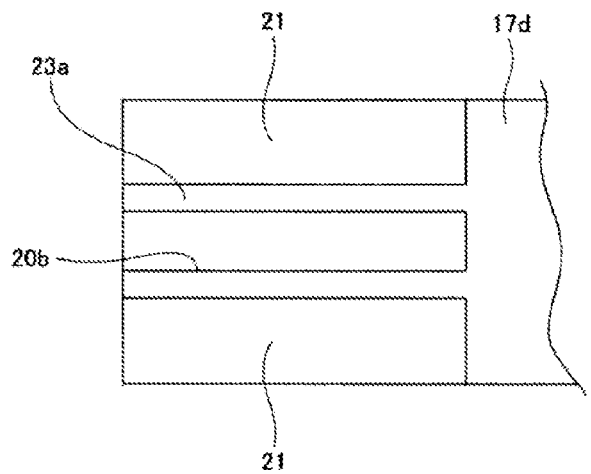
FIG. 8 is a schematic plan view of a front portion of the outer column which can be employed in the present invention when viewed from a lower side.
Figure 9:
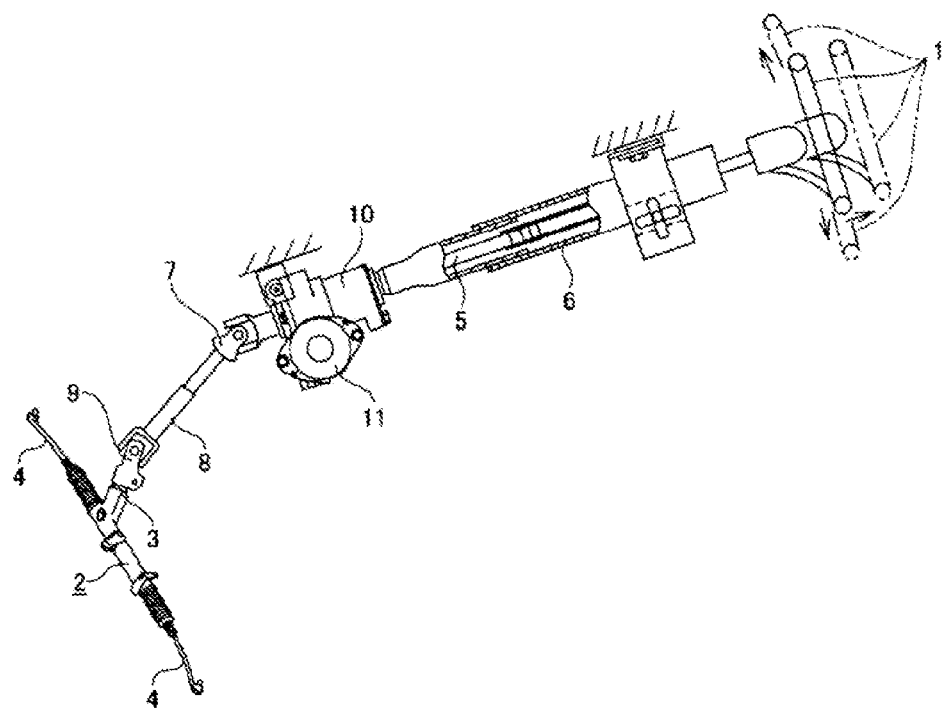
FIG. 9 is a schematic side view which illustrates an example of a conventionally-known steering device and which has a partially cut surface.
Figure 10:
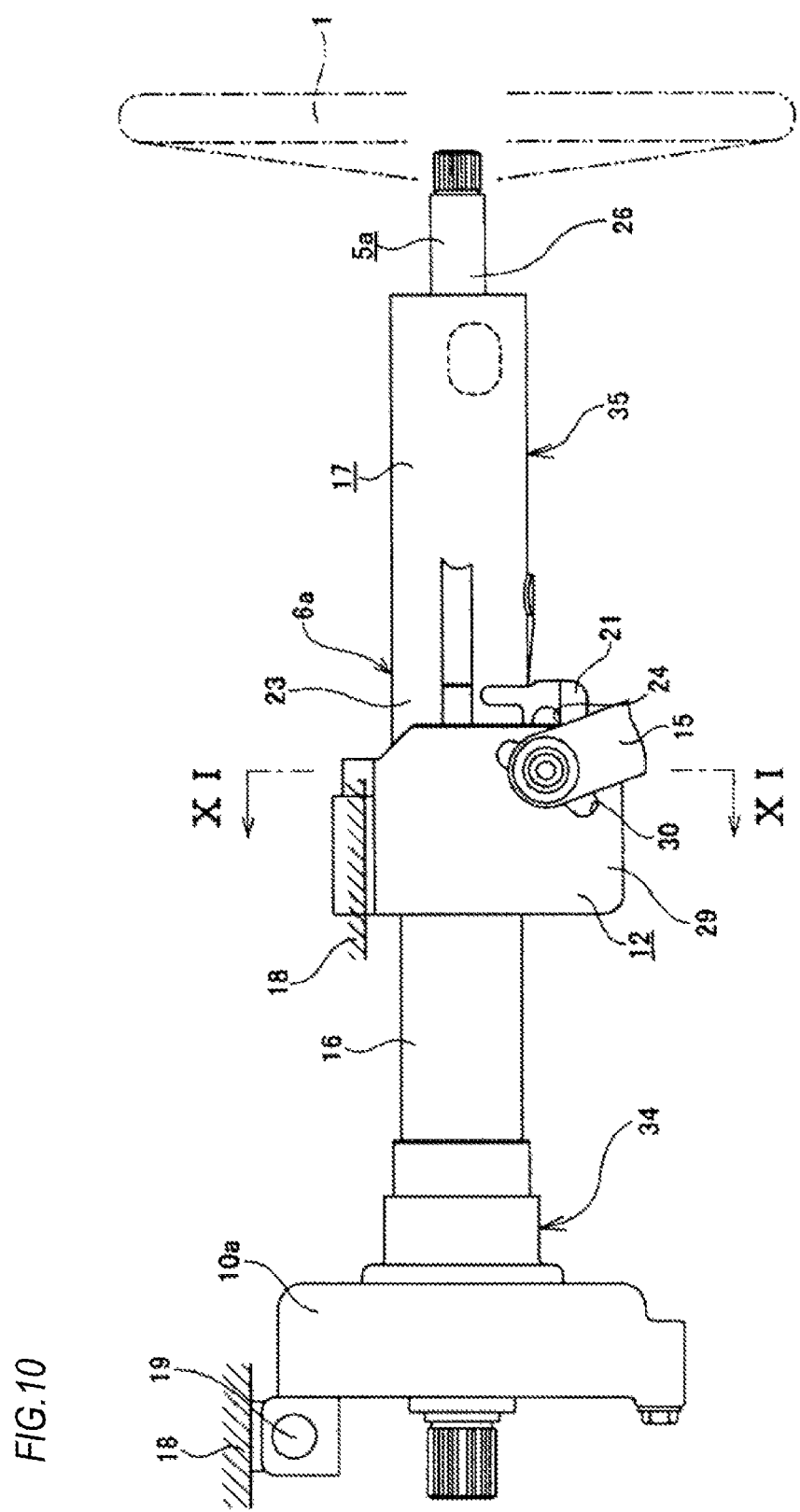
FIG. 10 is a side view illustrating an example of a conventional structure of a telescopic steering device.
Figure 11:
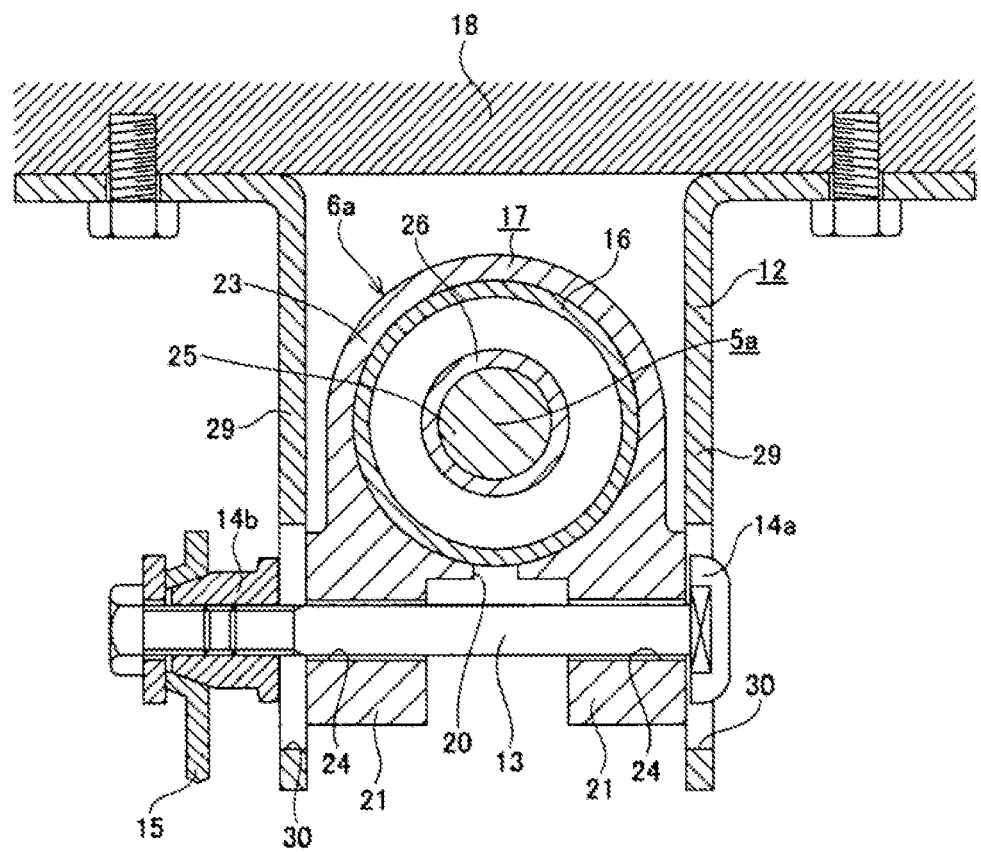
FIG. 11 is a sectional view along line XI-XI of FIG. 10.
Figure 12:
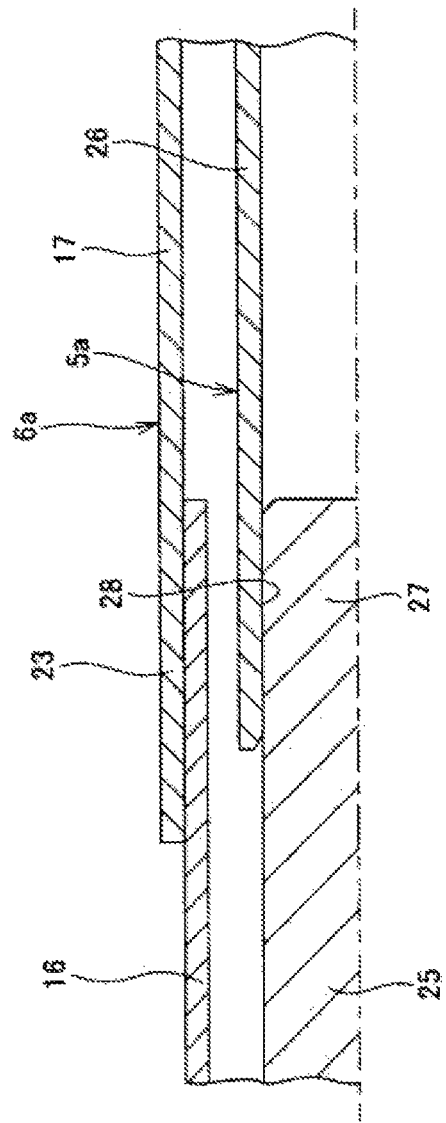
FIG. 12 is a half-sectional view illustrating a fitting portion between elements which configure a steering column and a steering shaft.
Figure 13:
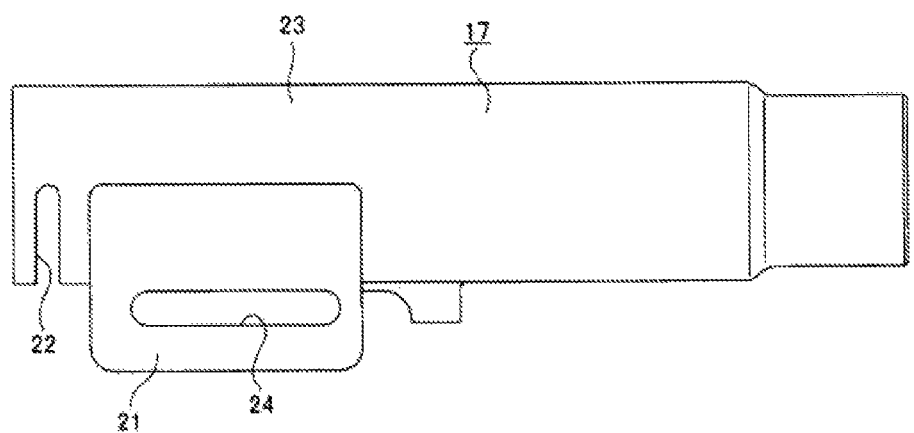
FIG. 13 is a side view of the outer column.
Figure 14:
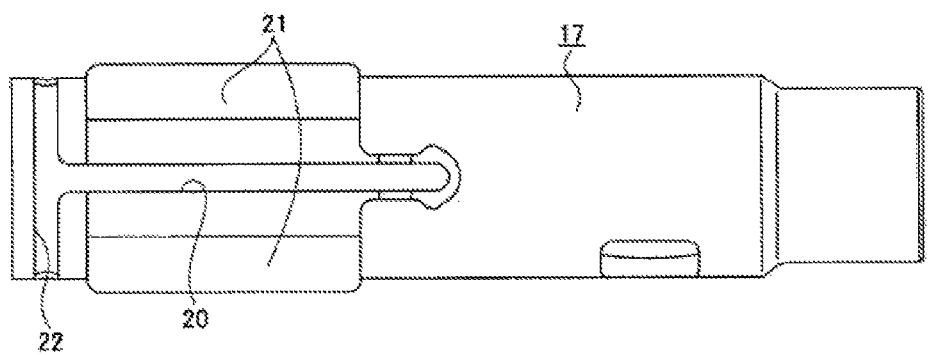
FIG. 14 is a bottom view when

In the example, as schematically illustrated in FIG. 8, a structure (a structure in which one end edge of the outer column 17d and one end edge of the expansion and contraction cylinder portion 23a match each other without providing a circumferential slit at one end side portion of the outer column 17d) in which one end portion of an axial slit 20b provided in an outer column 17d is opened to one end edge of the outer column 17d can be employed.

In the example, it is preferable that the axial positions of both ends of the expansion and contraction cylinder portion (axial slit) in the axial direction and both end edges of a pair of sandwiched portions in the axial direction, which are provided in the outer column, substantially match each other, but there may be slight displacement.

In the example, it is preferable that the shaft guide portion which is inclined in the direction in which the outside diameter decreases as proceeding to the end side is provided in the end portion of the outer circumferential surface of the spline shaft portion, and the hole guide portion which is inclined in the direction in which the inside diameter increases as proceeding to the end side is provided in the end portion on the inner circumferential surface of the spline hole.

In the example, it is also possible to provide the coating layer which is made of a synthetic resin having a low coefficient of friction on the surface of the male spline portion. Alternatively, it is also possible to add a known backlash eliminating mechanism to the spline engagement portion between the spline shaft portion and the spline hole.

In the example, it is preferable that the width dimension of the penetrating portion in the left-right direction is greater than a radial dimension of the male spline portion at least at a part in the front-rear direction.

In the example, it is possible to employ a structure in which one end portion of the axial slit is opened in one end edge of the outer column. In this case, one end edge of the outer column becomes one end edge (one end edge of the axial slit) of the expansion and contraction cylinder portion.

INDUSTRIAL APPLICABILITY

The present invention can be carried out as a vehicle steering device. In addition, the present invention can also be carried out as a telescopic steering device which can adjust front and rear positions of a steering wheel, and a tilt and telescopic steering device which can adjust a height position in addition to the front and rear positions.

The present application is based on Japanese Patent Application No. 2013-94421 filed on Apr. 26, 2013, Japanese Patent Application No. 2014-78439 filed on Apr. 7, 2014, and Japanese Patent Application No. 2013-108724 filed on May 23, 2013, the contents of which are incorporated herein by reference.

DESCRIPTION OF REFERENCE NUMERALS

1: steering wheel
2: steering gear unit
5, 5a, 5b: steering shaft
6, 6a, 6b: steering column
10, 10a: housing
16, 16a: inner column
17, 17a, 17b, 17c, 17d: outer column
18: vehicle body
19: supporting shaft
20, 20a, 20b: axial slit
21, 21a: sandwiched portion
22, 22a, 22b: circumferential slit
23, 23a: expansion and contraction cylinder portion
24: front-rear long hole
25, 25a: inner shaft
26, 26a: outer shaft
27: spline shaft portion
28: spline hole
32a, 32b: single-row deep groove ball bearing
33: single-row deep groove ball bearing
34, 34a: front assembly
35, 35a: rear assembly
36: front half portion
37: rear half portion
38: cutout
39a, 39b: window hole
55a, 55b: small diameter portion
56: large diameter portion

The invention claimed is:

1. A telescopic steering device comprising:
a steering column which is swingably displaceable around a tilt shaft disposed in a width direction;
a front assembly which is disposed on a front side; and
a rear assembly which is disposed on a rear side,
wherein the front assembly is configured by disposing a front shaft on an inner diameter side of a cylindrical front column while a front end portion of the front column or a housing fixed to the front end portion of the front column supports a front end portion of the front shaft or a shaft member linked to the front end portion by a front rolling bearing to be only rotatable,
wherein the rear assembly is configured by disposing a rear shaft on an inner diameter side of a cylindrical rear column while a rear end portion of the rear column supports a rear side portion of the rear shaft by a rear rolling bearing to be only rotatable,
wherein among the front column and the rear column, one column is an outer column and the other column is an inner column,
wherein one end side portion on an inner column side of the outer column in an axial direction is provided with an axial slit which is long in the axial direction of the outer column and a pair of sandwiched portions which interpose the axial slit from both sides in the width direction perpendicular to the axial direction, and a portion between both end edges of the axial slit of the outer column is configured as an expansion and contraction cylinder portion which can elastically expand and contract a diameter dimension,
wherein one end side portion on an outer column side of the inner column in the axial direction is internally fitted to the expansion and contraction cylinder portion of the outer column, and in a state where the one end side portion is internally fitted, a state where a relative displacement between the inner column and the outer column in the axial direction is enabled and a state where the relative displacement is not enabled can be switched based on an elastic expansion and contraction of the diameter dimension of the expansion and contraction cylinder portion,
wherein a spline shaft portion formed with a male spline portion on an outer circumferential surface is provided on one of a rear portion of the front shaft and a front portion of the rear shaft, a spline hole having a tip end which is opened and formed with a female spline portion on an inner circumferential surface is provided on the other of the rear portion of the front shaft and the front portion of the rear shaft, and the spline shaft portion and the spline hole are spline-engaged to be capable of transferring torque and to be slidable in the axial direction, and
wherein if, among the front shaft and the rear shaft, a shaft which is disposed on an inner diameter side of the outer column is referred to as an outer column shaft, and a shaft which is disposed on an inner diameter side of the inner column is referred to as an inner column shaft,
an axial position of one end edge on an inner column side of the outer column shaft in the axial direction and an axial position of one end edge on an inner column side of the expansion and contraction cylinder portion of the outer column substantially match each other,
an axial position of one end edge on an outer column side of the inner column shaft in the axial direction and an axial position of one end edge on an outer column side of the inner column in the axial direction substantially match each other,
one end portion on the inner column side of the outer column is formed with a penetrating portion on an opposite portion of the axial slit in a radial direction to penetrate through the opposite portion in the radial direction, and
the penetrating portion is provided in a state of being overlapped with one end portion on the inner column side of the outer column shaft in the radial direction such that in a state before the one end side portion of the inner column is internally fitted to the expansion and contraction cylinder portion of the outer column, the one end portion on the inner column side of the outer column shaft is viewable from an outside of the outer column through the penetrating portion.

2. The telescopic steering device according to claim 1, wherein a displacement range in the axial direction between the axial position of the one end edge on the inner column side of the outer column shaft in the axial direction and the axial position of the one end edge on the inner column side of the expansion and contraction cylinder potion of the outer column is within 3 mm, and
wherein a displacement range in the axial direction between the axial position of the one end edge on the outer column side of the inner column shaft in the axial direction and the axial position of the one end edge on the outer column side of the inner column in the axial direction is within 3 mm.

3. The telescopic steering device according to claim 1, wherein the penetrating portion is a cutout which is opened to the one end edge of the outer column.

4. The telescopic steering device according to claim 1, wherein the penetrating portion is a window hole which is opened at a rear side than the one end edge of the outer column in the axial direction.

5. The telescopic steering device according to claim 1, wherein the one end portion of the outer column is formed with a circumferential slit which is long in a circumferential direction on a side where the axial slit is provided in a direction perpendicular to the axial direction, and one end portion of the axial slit is opened to a middle portion of the circumferential slit in a length direction thereof.

6. The telescopic steering device according to claim 1, wherein an inner diameter portion of the outer column has a large diameter portion which is not in contact with the inner column, and small diameter portions which are provided on front and rear sides of the large diameter portion in the axial direction and are in contact with the inner column, and
wherein, in the outer column, a rear end edge of the penetrating portion on a side opposite to an insertion side of the inner column is formed to be closer to the insertion side of the inner column than the small diameter portions.

7. The telescopic steering device according to claim 1, wherein the penetrating portion has a width dimension which becomes larger in a direction perpendicular to the axial direction as proceeding from a rear end edge toward a front end edge of the penetrating portion, and the width dimension at a portion corresponding to a front end edge of the outer column shaft in the axial direction is same as an outer dimension of the front end edge.

* * * * *